United States Patent Office 3,223,692
Patented Dec. 14, 1965

3,223,692
PROCESS FOR PRODUCTION OF CIS
1,4-POLYBUTADIENE
Ralph C. Farrar and Floyd E. Naylor, Bartlesville, Okla., assignors to Phillips Petroleum Company, a corporation of Delaware
No Drawing. Filed Aug. 30, 1961, Ser. No. 134,812
The portion of the term of the patent subsequent to Sept. 7, 1982, has been disclaimed and dedicated to the Public
10 Claims. (Cl. 260—94.3)

This invention relates to a process for polymerizing 1,3-butadiene so as to obtain a rubbery polymer. In one aspect, the invention relates to a process for producing cis 1,4-polybutadiene and to a novel catalyst system therefor.

This application is a continuation-in-part of our copending U.S. application Serial No. 824,926, filed on July 6, 1959, now abandoned.

Numerous methods have been advanced for the polymerization of 1,3-butadiene, including emulsion polymerization, alkali metal-catalyzed polymerization, and alfin-catalyzed polymerization. In the emulsion polymerization of butadiene, a polymer is obtained which has from about 60 to about 80 percent trans 1,4-addition, from about 5 to about 20 percent cis 1,4-addition and from about 15 to about 20 percent 1,2-addition. Sodium-catalyzed polybutadiene has been found to contain from about 60 to about 75 percent 1,2-addition, the remainder being cis and trans 1,4-addition. The utilization of potassium and other alkali metals as catalysts may cause the latter ratios to vary to some degree. A polybutadiene produced by an alfin-catalyzed polymerization has from about 65 to about 75 percent trans 1,4-addition, from about 5 to about 10 percent cis 1,4-addition and from about 20 to about 25 percent 1,2-addition. Until quite recently it seems that no polymer of butadiene had been produced which contained more than about 35 percent cis 1,4-configuration. It has recently been discovered that a polybutadiene containing a very high percentage of cis 1,4-addition can be produced by utilizing a catalyst comprising certain organometals and titanium tetraiodide. It has also been found that when a catalyst comprising a tetraalkyl titanate and a trialkylaluminum is employed in the polymerization of 1,3-butadiene, a polymer is obtained which has a very high vinyl content. In accordance with the present invention, a process which employs a novel catalyst system is provided for preparing a polybutadiene of high cis 1,4-content.

It is an object of this invention to provide a novel process for producing a rubbery polymer of 1,3-butadiene.

Another object of the invention is to provide a process for polymerizing 1,3-butadiene in which the rubbery polymer product produced contains a high percentage of cis 1,4-addition.

A further object of the invention is to provide a novel catalyst system for use in the preparation of a polybutadiene of high cis 1,4-content.

Other and further objects and advantages of the invention will become apparent to those skilled in the art upon consideration of the accompanying disclosure.

Broadly speaking, the process of this invention comprises contacting 1,3-butadiene with a catalyst comprising (a) a compound corresponding to the formula $R_3Al$, wherein R is a member selected from the group consisting of alkyl, cycloalkyl, aryl and combinations of these radicals, e.g., alkaryl, aralkyl, alkylcycloalkyl and cycloalkylalkyl, (b) a compound corresponding to the formula $Ti(OR)_4$, wherein R is as defined above, and (c) a compound having the formula $MI_n$, wherein M is a metal selected from the group consisting of beryllium, zinc, cadmium, aluminum, gallium, indium, thallium, titanium, silicon, germanium, tin, lead, phosphorus, antimony, arsenic and bismuth, and $n$ is an integer from 2 to 5, inclusive. The R radicals preferably contain from 1 to 20, inclusive, carbon atoms. As mentioned hereinbefore when a titanate, i.e., a compound of the formula $Ti(OR)_4$ as hereinbefore described, is used in conjunction with a trialkylaluminum to polymerize 1,3-butadiene, the resulting polymer has a very high vinyl content. It was completely unexpected, therefore, when it was found that a polybutadiene having a cis 1,4-configuration is produced with a titanate-trialkylaluminum catalyst system to which a small amount of metal iodide ($MI_n$ compound) has been added. The polybutadiene contains at least about 85 percent, e.g., from 85 to 98 percent and higher, cis 1,4-addition. The product is also distinguished by the fact that it contains only a very small amount of trans 1,4-addition, generally less than 2 percent and as low as 0.4 percent and lower. The remainder of the polybutadiene product is formed by 1,2-addition of the butadiene. The process of this invention also provides certain economic advantages. For example, practice of the instant invention makes it possible to produce a cis 1,4-polybutadiene while using only a small amount of titanium tetraiodide. Since the titanium tetraiodide is more expensive than the titanate, the cost of the catalyst per pound of polymer is much less than when employing the trialkylaluminum-titanium tetraiodide catalyst system. Also, the present catalyst system is much less corrosive than one containing a component such as titanium tetrachloride.

Examples of organoaluminum compounds corresponding to the formula $R_3Al$ which can be employed in the present process include trimethylaluminum, triethylaluminum, triisobutylaluminum, tri-n-pentylaluminum, triisooctylaluminum, tri-n-dodecylaluminum, triisooctadecylaluminum, tri-n-eicosylaluminum, tricyclopentylaluminum, triphenylaluminum, tri-p-tolylaluminum, tribenzylaluminum, triphenylethylaluminum, tri(3 - tert - butylcyclohexyl)aluminum, tri(4 - phenylcyclohexyl)aluminum, methylisopropylphenylaluminum, tri(10 - cyclopentyldecyl)aluminum, and the like.

The titanates which are employed as components in the present catalyst system correspond to the formula $Ti(OR)_4$, wherein R is an alkyl, aryl, cycloalkyl, alkaryl, or aralkyl radical. The R radical preferably contains from 1 to 20, more desirably from 3 to 10, inclusive, carbon atoms. Specific examples of such compounds include tetramethyl titanate, tetraethyl titanate, tetraisopropyl titanate, tetra-n-butyl titanate, tetra-sec-butyl titanate, tetra-2-ethylhexyl titanate, tetra-o-tolyl titanate, tetraphenyl titanate, tetrabenzyl titanate, tetra-2-phenylethyl titanate, tetracyclohexyl titanate, and the like.

Examples of specific catalyst systems which can be employed in the practice of this invention include the following: triethylaluminum, tetraethyl titanate, and titanium tetraiodide; triisobutylaluminum, tetra-n-butyl titanate, and titanium tetraiodide; triisobutylaluminum, tetraisopropyl titanate, and titanium tetraiodide; tri-n-pentylaluminum, tetra-sec-butyl titanate, and titanium tetraiodide; triisooctylaluminum, tetra - 2 - ethylhexyl titanate, and titanium tetraiodide; triisobutylaluminum, tetraphenyl titanate, and titanium tetraiodide; tri-n-pentylaluminum, tetrabenzyl titanate, and titanium tetraiodide; triethylaluminum, tetracyclohexyl titanate, and titanium tetraiodide; triisobutylaluminum, tetra-2-ethylhexyl titanate and titanium tetraiodide; triethylaluminum, tetraethyltitanate, and antimony triiodide; triethylaluminum, tetraethyl titanate, and beryllium diiodide; triisobutylaluminum, tetra-n-butyl titanate, and aluminum triiodide; tri-n-pentylaluminum, tetra-n-pentyl titanate, and aluminum triiodide; tri-n-butylaluminum, tetraisopropyl titanate, and phosphorus triiodide; triphenylaluminum, tetrabenzyl titanate, and tin tetraiodide; tricyclopentylaluminum, tetracyclohexyl titanate, and antimony triiodide; triisobuytlaluminum, tetra-sec-butyl titanate, and silicon tetraiodide; triisooctylaluminum, tetra-2-ethylhexyl titanate, and gallium triiodide; tri-n-hexylaluminum, tetra-n-butyl titanate, and arsenic triiodide; tri-p-tolylaluminum, tetra-2-phenylethyl titanate, and germanium tetraiodide; and tri-n-heptylaluminum, tetra-n-hexyl titanate, and cadmium diiodide.

The mol ratio of the organoaluminum compound corresponding to the formula $R_3Al$ to the metal iodide is in the range of 2:1 to 100:1. The mol ratio of the organoaluminum compound to the $Ti(OR)_4$ compound is in the range of 2:1 to 100:1 while the mol ratio of the $Ti(OR)_4$ compound to the metal iodide is in the range of 0.5:1 to 3:1, preferably 0.5:1 to 2:1. It is important that the mol ratio of the $Ti(OR)_4$ compound to the metal iodide be maintained in these ranges. For example, when the mol ratio of $Ti(OR)_4$ to titanium tetraiodide is greater than about 3 to 1, the high cis-polybutadiene product is not obtained. The catalyst level is in the range from 1 to 20 gram millimoles of the organoaluminum compound per 100 grams of the 1,3-butadiene to be polymerized.

The polymerization process of this invention is usually carried out in the presence of a diluent. Diluents suitable for use in the process are hydrocarbons which are not detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Also, mixtures of any of the aforementioned hydrocarbons can be used as diluents.

The polymerization process of this invention can be carried out at any temperature within the range of —100 to 175° F. The polymerization reaction can be carried out under autogenous conditions or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction. It is to be understood also that it is within the scope of the invention to carry out the polymerization in the solid phase.

The process of this invention can be carried out as a batch process by charging 1,3-butadiene into a reactor containing catalyst and diluent. Although any suitable charging procedure can be used, it is usually preferred to add the catalyst components to a reactor containing diluent and thereafter introducing the 1,3-butadiene. It is also within the scope of the invention to preform the catalyst by reacting the catalyst components within a separate catalyst preparation vessel. The resulting reaction product is then charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits depending upon such variables as temperature, pressure, the ratio of the catalyst components, and the catalyst concentration. In a continuous process, the residence time will usually fall within the range of 1 second to 1 hour when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is highly desirable, therefore, that the 1,3-butadiene be freed to these materials as well as other materials which may tend to inactivate the catalyst. Any of the known means for removing such contaminants can be used. Furthermore, when a diluent is used in the process, it is preferred that this material be substantially freed of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

At the completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating agent and the antioxidant, the polymer present in the solution can then be separated by the addition of an excess of the material such as ethyl alcohol or isopropyl alcohol. When the process is carried out continuously, the total effluent from the reactor can be pumped from the reactor to the catalyst-inactivating zone where the reactor effluent is contacted with a suitable catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the solvent mixture and alcohol by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the rubbers of this invention. It is also within the scope of the invention to blend the polymers with other polymers such as natural rubber, polyethylene and the like. As mentioned hereinbefore, the polymers of this invention have a high cis 1,4-content which renders them very suitable for applications requiring low hysteresis, high resiliency, low freeze point and easy milling. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition and 1,2-addition of the butadiene. Except for Examples IV and VII, the procedure described hereinafter was employed in making these determinations. In Examples IV and VII, the microstructure was determined by the complete infrared method described by Silas, Yates and Thornton in "Determination of Unsaturation Distribution in Polybutadiene by Infrared Spectrometry," Analytical Chemistry 31, 529 (1959).

The polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); E=extinction (log $I_0/I$); $t$=path length (centimeters); and $c$=concentration (mols double bond/liter). The extinction was determined at the 10.35 micron band, and, except where noted by an appropriate footnote, the extinction coefficient was 133 (liters-mols$^{-1}$-centimeters$^{-1}$).

The percent of the total unsaturation as 1,2- (or vinyl) was calculated according to the above equation, using the 11.0 micron band and, except where noted by an appropriate footnote, an extinction coefficient at 184 (liters-mols$^{-1}$-centimeters$^{-1}$).

The percent of the total unsaturation present as cis 1,4- was obtained by subtracting the trans 1,4- and 1,2- (vinyl) determined according to the above procedures, from the theoretical unsaturation, assuming one double bond per each $C_4$ unit in the polymer.

EXAMPLE I

A series of polymerization runs was carried out in which 1,3-butadiene was polymerized by means of a catalyst system consisting of triisobutylaluminum, tetra-n-butyl titanate [$Ti(O-n-C_4H_9)_4$], and titanium tetraiodide. The polymerization recipe was as follows:

| | Parts by weight |
|---|---|
| 1,3-butadiene | 100 |
| Toluene | 1200 |
| Triisobutylaluminum (TIBA) ( 4.3 mmoles) | 0.85 |
| Tetra-n-butyl titanate (TBT) | variable |
| Titanium tetraiodide (TTI) | variable |
| TBT:TTI mole ratio | 1:1 |
| Temperature, °F. | 41 |
| Time, hours | 17 |

A solution containing a mixture of tetra-n-butyl titanate and titanium tetraiodide was prepared by charging 100 ml. of dry toluene to a seven-ounce bottle and adding 2.93 millimoles each of tetra-n-butyl titanate and titanium tetraiodide. The bottle was capped and shaken. The resulting solution was 0.029 molar in each of the materials added to the toluene.

Polymerization was effected in 7-ounce beverage bottles. The toluene was charged first, after which the bottles were purged with nitrogen for 4 minutes at the rate of 3 liters of nitrogen per minute. The bottles were then capped and pressured to 20 p.s.i. with nitrogen. Thereafter, the triisobutylaluminum was added as an 0.43 molar solution in toluene. The bottles were placed in a 41° F. bath for 30 minutes after which they were removed and the butadiene was introduced. The 1:1 mixture of tetrabutyl titanate and titanium tetraiodide was added, and the bottles were again placed in the 41° F. bath and tumbled throughout the polymerization period. The bottles were removed from the bath and to each was added 0.5 ml. of a solution of the antioxidant, [2,2',methylene-bis(4-methyl-6-tert-butylphenol)], which was prepared by dissolving 52 grams of the compound in four liters of toluene and adding 100 ml. of isopropanol. The isopropanol served as a shortstop. After addition and thorough mixing with the antioxidant solution, the contents of each bottle was poured into approximately one liter of isopropyl alcohol and the mixture was stirred vigorously. The polymer which precipitated was separated and dried overnight in a vacuum oven. Results of the several runs are shown hereinbelow in Table I.

*Table I*

| Run | TTI, mmoles | TIBA/TBT/TTI, mole ratio | Conversion, percent | Inherent viscosity | Gel, percent |
|---|---|---|---|---|---|
| 1 | 1.075 | 4/1/1 | 100 | 3.29 | 0 |
| 2 | 0.86 | 5/1/1 | 100 | 3.52 | 0 |
| 3 | 0.717 | 6/1/1 | 100 | 3.26 | 0 |
| 4 | 0.614 | 7/1/1 | 100 | 3.58 | 0 |
| 5 | 0.537 | 8/1/1 | 91 | 3.85 | 0 |
| 6 | 0.43 | 10/1/1 | 71 | 4.16 | 0 |
| 7 | 0.293 | 15/1/1 | 42 | 4.60 | 0 |

Products from four of the runs were examined by infrared analysis. The results of the infrared examinations were as follows:

| Run No | 1 | 3 | 5 | 7 |
|---|---|---|---|---|
| Cis, percent | 93.6 | 95.1 | 96.0 | 94.9 |
| Trans, percent | 3.2 | 1.5 | 0.7 | 1.1 |
| Vinyl, percent | 3.2 | 3.4 | 3.3 | 4.0 |

EXAMPLE II

Butadiene was polymerized in the presence of a catalyst system consisting of triisobutylaluminum, tetraisopropyl titanate, and titanium tetraiodide in accordance with the following recipe:

| | Parts by weight |
|---|---|
| Butadiene | 100 |
| Toluene | 433 |
| Triisobutylaluminum (TBA) (7.00 mmoles) | 1.39 |
| TTI–TPT [1] (2.46 mmoles) | 1.03 |

Al:Ti mole ratio _____ 2.84:1
Temperature, ° C. _____ 50
Time, hours _____ 65

¹ Titanium tetraiodide-tetraisopropyl titanate. A mixture was prepared by mixing 5.60 mmoles (3.1140 grams) of titanium tetraiodide in 50 milliliters of toluene with a solution of 5.60 mmoles (18.3 ml.) of tetraisopropyl titanate in toluene (0.306 M). The resulting mixture was 0.164 molar in titanium.

Polymerization was effected in a 7-ounce bottle. The toluene was charged first after which it was purged with nitrogen at the rate of 3 liters per minute. The triisobutylaluminum was added, followed by the tetraisopropyl titanate/titanium tetraiodide mixture and then by the butadiene. The polymerization was conducted at a temperature of 50° C. Recovery of the polymer was accomplished in the manner described in Example I except that phenyl-betanaphthylamine (PBNA) was used as the antioxidant. This run gave a 70 percent conversion. The polymer had an inherent viscosity of 2.75 and was gel free. Results of two determinations for total unsaturation gave values of 92.2 and 91.5 percent.

EXAMPLE III

A portion of the tetraisopropyl titanate/titanium tetraiodide mixture prepared in Example II was allowed to stand for three days. At the end of this period, some solid material had separated. The supernatant liquid was withdrawn, placed in a dry bottle, and a portion of it was analyzed for titanium and found to be 0.0456 molar. This solution is hereinafter referred to as the oxidant solution and it was employed in a catalyst system for the polymerization of butadiene according to the following recipe:

| | Parts by weight |
|---|---|
| Butadiene | 100 |
| Toluene | 433 |
| Triisobutylaluminum _____(7.0 mmoles) | 1.39 |
| Oxidant solution | variable |
| Temperature, ° C. | 50 |
| Time, hours | 23 |

The charging procedure was the same as described in Example II and recovery of the polymer was as described in Example I. Results of a series of runs are shown below in Table II.

Table II

| Run | Ti added, mmoles | TBA/Ti, mmoles | Conversion, percent | Inherent viscosity | Gel, percent |
|---|---|---|---|---|---|
| 1 | 0.228 | 30.7/1 | 53 | 3.01 | 4 |
| 2 | 0.319 | 22.0/1 | 79 | 2.11 | trace |
| 3 | 0.410 | 17.1/1 | 85 | 1.89 | 2 |
| 4 | 0.583 | 12.0/1 | 98 | 1.79 | 0 |
| 5 | 0.821 | 8.5/1 | 98 | 1.69 | 0 |
| 6 | 0.912 | 7.7/1 | 98 | 1.54 | 0 |
| 7 | 1.369 | 5.1/1 | 96 | 1.48 | 0 |

EXAMPLE IV

A series of runs was carried out in which 1,3-butadiene was polymerized with a catalyst consisting of tetra-2-ethylhexyl titanate, titanium tetraiodide and triisobutylaluminum. The recipe employed in this series of runs was as follows:

| | Parts by weight |
|---|---|
| Butadiene | 100 |
| Toluene | 1200 |
| Triisobutylaluminum (TBA) ____(4 mmoles) | 0.792 |
| Tetra-2-ethylhexyl titanate (TEHT) | variable |
| Titanium tetraiodide (TTI) | variable |
| Temperature, ° F. | 41 |
| TTI:TEHT mole ratio | 1:1 |
| Time, hours | 2.5 |

The toluene was placed in 7-ounce bottles and purged for 5 minutes with prepurified nitrogen at the rate of 3 liters per minute. The triisobutylaluminum (0.46 M solution in toluene) was added, and the bottles were brought to a temperature of 41° F. A mixture of the titanium tetraiodide and tetra-2-ethylhexyl titanate, which was at a temperature of 41° F., was introduced, followed by the butadiene. The bottles were placed in a 41° F. bath and tumbled throughout the polymerization period. Results of the several runs are shown below in Table III.

Table III

| Run No. | TTI, mmoles | TBA/TEHT/TTI, mole ratio | Conversion, percent | Inherent viscosity¹ | Gel, percent¹ |
|---|---|---|---|---|---|
| 1 | 1.0 | 4/1/1 | 80 | 4.02 | 0 |
| 2 | 0.8 | 5/1.25/1.25 | 45 | 3.29 | 0 |
| 3 | 0.67 | 6/1.5/1.5 | 31 | 3.08 | 0 |
| 4 | 0.57 | 7/1.75/1.75 | 22 | | |
| 5 | 0.44 | 9/2.25/2.25 | 16 | | |
| 6 | 0.36 | 11/2.75/2.75 | 10 | | |
| 7 | 0.267 | 15/3.75/3.75 | 5 | | |

¹ Inherent viscosity and gel determinations were not run on the polymers prepared in the last 4 runs.

Infrared analyses were run on products from Runs 3, 4, 5 and 7, and the results were as follows:

| Run No. | Cis, percent | Trans, percent | Vinyl, percent |
|---|---|---|---|
| 3 | 96.4 | 0.6 | 3.0 |
| 4 | 96.5 | 0.5 | 3.0 |
| 5 | 96.4 | 0.5 | 3.1 |
| 7 | 96.2 | 0.4 | 3.4 |

EXAMPLE V

A series of runs was carried out in which 1,3-butadiene was polymerized with a catalyst similar to that used in Example IV. The recipe employed in this series of runs was as follows:

| | Parts by weight |
|---|---|
| Butadiene | 100 |
| Toluene | 1200 |
| Triisobutylaluminum (TBA) __(3.0 mmoles) | 0.594 |
| Titanium tetraiodide (TTI) | variable |
| Tetra-2-ethylhexyl titanate (TEHT) | variable |
| Temperature, ° C. | 30 |
| TTI:TEHT mole ratio | 1:1 |
| Time, hours | 1 |

Toluene was charged to dry 7-ounce bottles which were then purged with prepurified nitrogen for 4 minutes at the rate of 3 liters per minute. The bottles were capped and triisobutylaluminum was introduced, followed by the mixture of titanium tetraiodide and tetra-2-ethylhexyl titanate and then the butadiene. Polymerization was effected in a 30° C. bath, the bottles being tumbled throughout the polymerization period. The results shown in Table IV were obtained.

Table IV

| Run No. | TBA/TEHT/TTI, Mole ratio | Conversion, percent | Inherent viscosity | Gel, percent |
|---|---|---|---|---|
| 1 | 3/0.5/0.5 | 78 | 3.50 | 0 |
| 2 | 3/0.375/0.375 | 42 | 3.23 | 0 |
| 3 | 3/0.3/0.3 | 25 | 3.09 | 0 |
| 4 | 3/0.25/0.25 | 18 | 2.86 | 0 |
| 5 | 3/0.188/0.188 | 12 | 2.92 | 0 |
| 6 | 3/0/0.6 | 79 | 2.20 | 0 |

The products were examined by infrared analysis and the following results were obtained:

| Run No. | Cis, percent | Trans, percent | Vinyl, percent |
|---|---|---|---|
| 1 | 94.9 | 1.1 | 4.0 |
| 2 | 94.9 | 0.9 | 4.2 |
| 3 | 94.7 | 1.0 | 4.3 |
| 4 | 94.9 | 0.7 | 4.4 |
| 5 | 94.8 | 0.9 | 4.3 |
| 6 | 93.3 | 2.4 | 4.1 |

The products from Runs 2 and 6 were also examined by the complete infrared method of analysis described in "Determination of Unsaturation Distribution by Infrared Spectrometry" by Silas, Yates and Thornton, Anal. Chem., 31, pp. 529-532 (April 1959). The results of this examination were as follows:

| Run No. | Cis, percent | Trans, percent | Vinyl, percent |
|---|---|---|---|
| 2 | 95.9 | 0.4 | 3.7 |
| 6 | 94.0 | 2.2 | 3.8 |

From the foregoing it is seen that the polybutadiene produced in the presence of the catalyst of this invention contained a higher percentage of cis 1,4-addition than the polymer prepared with a catalyst which did not include the titanate. It is also noted that in Run 2 the polymer contained 95.9 percent cis 1,4-addition which is unexpectedly high for a polymer prepared at 30° C.

EXAMPLE VI

A series of runs was conducted in which 1,3-butadiene was polymerized with a catalyst consisting of triisobutylaluminum, tetra-n-butyl titanate and titanium tetraiodide. The recipe employed in this series of runs was as follows:

| | |
|---|---|
| Toluene, parts by weight | 860 |
| Butadiene, parts by weight | 100 |
| Triisobutylaluminum (TBA), mmoles | 3.5 or 7.0 |
| Titanium tetraiodide (TTI) | variable |
| Tetrabutyl titanate (TBT) | variable |
| Temperature, ° F. | 122 |
| Time, hours | 18 or 40 |

The polymerizations were conducted in 7-ounce bottles, using 10 gram charges of butadiene. Toluene was added first to the bottles which were then purged with prepurified nitrogen for 5 minutes at the rate of 3 liters per minute. The bottles were then capped and butadiene, triisobutylaluminum, and mixtures of titanium tetraiodide and tetra-n-butyl titanate were added in that order. The titanium tetraiodide-tetra-n-butyl titanate mixures were all 0.0117 molar in total titanium in toluene with the amounts of the components being varied to give the appropriate ratios. The results obtained are shown in Table V.

The products were examined by infrared analysis and the following results were obtained:

| Run No. | Cis, percent | Trans, percent [1] | Vinyl, percent [2] |
|---|---|---|---|
| 1 | 94.1 | 2.0 | 3.9 |
| 2 | 95.4 | 1.1 | 3.5 |
| 3 | 93.5 | 1.3 | 5.2 |
| 4 | 92.9 | 1.6 | 5.5 |
| 5 | 94.9 | 1.0 | 4.1 |
| 6 | 93.7 | 1.3 | 5.0 |
| 7 | 92.9 | 1.7 | 5.4 |
| 8 | 91.3 | 1.7 | 7.0 |
| 9 | 93.4 | 1.5 | 5.1 |
| 10 | 92.3 | 1.5 | 6.2 |
| 11 | 90.9 | 1.9 | 7.2 |
| 12 | 84.6 | 5.7 | 8.7 |
| 13 | 90.5 | 2.1 | 7.4 |
| 14 | 84.7 | 3.9 | 11.4 |
| 15 | 80.4 | 4.0 | 15.6 |
| 16 | 78.3 | 3.8 | 18.9 |

[1] Extinction coefficient was 146.
[2] Extinction coefficient was 209.

The foregoing data indicate that when using mol ratios of the titanate to the titanium tetraiodide up to 3:1, a polybutadiene containing a high percentage of cis 1,4-addition, i.e., at least about 85 percent cis 1,4-addition, was obtained. At greater mol ratios, the high cis-polybutadiene product of this invention was not obtained.

EXAMPLE VII

A series of runs was conducted in which 1,3-butadiene was polymerized with a catalyst consisting of triisobutylaluminum, tetra-n-butyl titanate and titanium tetraiodide. Control runs were also conducted in which a catalyst consisting of triisobutylaluminum and tetra-n-butyl titanate and a catalyst consisting of titanium tetraiodide and tetra-n-butyl titanate were used. The recipe used in the runs was as follows:

RECIPE

| | Parts by weight |
|---|---|
| Butadiene | 100 |
| Toluene | 866 |
| Triisobutylaluminum (TBA) | variable |
| Titanium tetraiodide (TTI) | variable |
| Tetrabutyl titanate (TBT) | variable |
| TBA/TTI/TBT, mole ratio | variable |
| Temperature, ° F. (° C.) | (30) 86 |
| Time, hours | variable |

*Table V*

DATA FROM RUNS USING 3.5 MHM OF TBA AND AN 18 HOUR REACTION TIME

| Run No. | TBA/Total Ti, mol ratio | Total Ti, mhm [1] | TTI, mhm [1] | TBT, mhm [1] | Mol ratios | | | Conversion, percent |
|---|---|---|---|---|---|---|---|---|
| | | | | | TBT/TTI [2] | TBA/TTI | TBA/TBT | |
| 1 | 3/1 | 1.17 | 0.78 | 0.39 | 0.5/1 | 4.5/1 | 9/1 | 98 |
| 2 | 5/1 | 0.70 | 0.467 | 0.233 | 0.5/1 | 7.5/1 | 15/1 | 98 |
| 3 | 10/1 | 0.35 | 0.233 | 0.117 | 0.5/1 | 15/1 | 30/1 | 66 |
| 4 | 25/1 | 0.14 | 0.093 | 0.047 | 0.5/1 | 38/1 | 75/1 | 12 |
| 5 | 3/1 | 1.17 | 0.585 | 0.585 | 1/1 | 6/1 | 6/1 | 93 |
| 6 | 5/1 | 0.70 | 0.35 | 0.35 | 1/1 | 10/1 | 10/1 | 62 |
| 7 | 10/1 | 0.35 | 0.175 | 0.175 | 1/1 | 20/1 | 20/1 | 40 |
| 8 | 25/1 | 0.14 | 0.07 | 0.07 | 1/1 | 50/1 | 50/1 | 6 |
| 9 | 3/1 | 1.17 | 0.39 | 0.78 | 2/1 | 9/1 | 4.5/1 | 18 |
| 10 | 5/1 | 0.70 | 0.233 | 0.467 | 2/1 | 15/1 | 7.5/1 | 14 |
| 11 | 10/1 | 0.35 | 0.117 | 0.233 | 2/1 | 30/1 | 15/1 | 7 |
| 12 | 3/1 | 1.17 | 0.293 | 0.877 | 3/1 | 12/1 | 4/1 | 2 |
| 13 | 5/1 | 0.70 | 0.175 | 0.525 | 3/1 | 20/1 | 6.7/1 | 7 |
| 14 | 10/1 | 0.35 | 0.088 | 0.262 | 3/1 | 40/1 | 13/1 | 2 |

DATA FROM RUNS USING 7.0 MHM OF TBA AND A 40 HOUR REACTION TIME

| 15 | 7/1 | 1.17 | 0.234 | 0.936 | 4/1 | 30/1 | 7.5/1 | 16 |
| 16 | 7/1 | 1.17 | 0.195 | 0.975 | 5/1 | 36/1 | 7.2/1 | 14 |

[1] Millimoles per 100 grams of monomer.
[2] Runs were also conducted using 3.5 mhm of TBA with TBT/TTI ratios of 1/4 and 1/5. However, no polymer was obtained; so Runs 15 and 16 were carried out using 7.0 mhm of TBA and a longer reaction time.

The procedure followed in each of the runs was to charge the toluene initially to the reactor which was then purged with nitrogen. A solution of triisobutylaluminum in toluene was then charged to the reactor after which a mixture of titanium tetraiodide and tetra-n-butyl titanate was added. In the case of the control runs employing the catalyst consisting of tetra-n-butyl titanate and triisobutylaluminum, tetra-n-butyl titanate was added as a solution in toluene after addition of triisobutylaluminum. In the case of the control run using the catalyst consisting of titanium tetraiodide and tetra-n-butyl titanate, the materials were charged as a mixture after the reactor had been purged with nitrogen. About 5 minutes after addition of the catalyst components, the butadiene was charged. The results obtained in the runs are shown below in Table VI.

Table VI

| Run No. | TBA, mhm[1] | TTI, mhm[1] | TBT, mhm[1] | Time, hours | Conversion, percent | Inherent viscosity | Gel, percent |
| --- | --- | --- | --- | --- | --- | --- | --- |
| 1 | 3.00 | 0.50 | 0.50 | 3 | 73 | 3.88 | 0 |
| 2 | 3.00 | 0 | 0.50 | 23 | 0 | | |
| 3 | 3.00 | 0 | 1.00 | 23 | 0 | | |
| 4 | 2.00 | 0.33 | 0.333 | 3 | 26 | 3.57 | trace |
| 5 | 2.00 | 0 | 0.333 | 23 | 0 | | |
| 6 | 2.00 | 0 | 0.667 | 23 | 0 | | |
| 7 | 20.00 | 0 | 3.33 | 23 | 12 | | |
| 8 | 30.00 | 0 | 5.00 | 23 | 18 | 7.84 | 46 |
| 9 | 30.00 | 0 | 6.00 | 23 | 23 | 9.20 | 69 |
| 10 | 0 | 0.50 | 0.50 | 23 | 0 | | |

[1] Millimoles per 100 grams of monomer.

Samples of the polymer obtained in Runs 1, 4 and 8 were examined by infrared analysis. The results obtained were as follows:

| Run No. | Cis, percent | Trans, percent | Vinyl, percent | Total found, percent |
| --- | --- | --- | --- | --- |
| 1 | 95.5 | 0.7 | 3.8 | 101.0 |
| 4 | 95.6 | 0.8 | 3.6 | 101.5 |
| 8 (Control) | 19.4 | 0.1 | 72.2 | 91.7 |

It is seen from the foregoing data that in Runs 1 and 4 carried out according to the present invention, the polybutadiene product contained a high percentage of cis 1,4-addition. On the other hand, when the catalyst system consisted of a titanate and a trialkylaluminuum as in Run 8, the polybutadiene contained a high percentage of 1,2-addition. It is noted that no polymer was obtained when the catalyst consisted of titanium tetraiodide and tetra-n-butyl titanate as in Run 10.

As will be evident to those skilled in the art many variations and modifications of this invention can be practiced in view of the foregoing disclosure. Such variations and modifications are clearly believed to come within the spirit and scope of the invention.

We claim:

1. A process for producing a rubbery polymer of 1,3-butadiene having at least 85 percent cis 1,4-addition which comprises contacting 1,3-butadiene with a catalyst which forms on mixing components comprising (a) a compound corresponding to the formula $R_3Al$, wherein R is selected from the group consisting of alkyl, cycloalkyl, aryl, and combinations of these radicals, (b) a compound corresponding to the formula $Ti(OR)_4$, wherein R is as defined above, and (c) a compound having the formula $MI_n$, wherein M is a metal selected from the group consisting of beryllium, zinc, cadmium, aluminum, gallium, indium, thallium, titanium, silicon, germanium, tin, lead, phosphorus, antimony, arsenic and bismuth, and $n$ is an integer from 2 to 5, inclusive, the mol ratio of said component (a) to said component (c) being in the range of 2:1 to 100:1, the mol ratio of component (a) to component (b) being in the range of 2:1 to 100:1, and the mol ratio of component (b) to component (c) being in the range of 0.5:1 to 3:1.

2. The process according to claim 1 in which said catalyst consists essentially of triisobutylaluminum, tetra-n-butyl titanate and titanium tetraiodide.

3. The process according to claim 1 in which said catalyst consists essentially of triisobutylaluminum, tetraisopropyl titanate and titanium tetraiodide.

4. The process according to claim 1 in which said catalyst consists essentially of triisobutylaluminum, tetra-2-ethylhexyl titanate and titanium tetraiodide.

5. The process according to claim 1 in which said catalyst consists essentially of triethylaluminum, tetraethyl titanate and aluminum triiodide.

6. A process for producing a rubbery polymer of 1,3-butadiene having at least 85 percent cis 1,4-addition which comprises contacting 1,3-butadiene with a catalyst formed by mixing materials comprising (a) a compound corresponding to the formula $R_3Al$, wherein R is selected from the group consisting of alkyl, cycloalkyl, aryl, and combinations of these radicals, (b) a compound corresponding to the formula $Ti(OR)_4$, wherein R is as defined above, and (c) a compound having the formula $MI_n$, wherein M is a metal selected from the group consisting of beryllium, zinc, cadmium, aluminum, gallium, indium, thallium, titanium, silicon, germanium, tin, lead, phosphorus, antimony, arsenic and bismuth, and $n$ is an integer from 2 to 5, inclusive, the mol ratio of said component (a) to said component (c) being in the range of 2:1 to 100:1, the mol ratio of component (a) to component (b) being in the range of 2:1 to 100:1, and the mol ratio of component (b) to component (c) being in the range of 0.5:1 to 3:1, said contacting occurring in the presence of a hydrocarbon diluent at a temperature in the range of −100 to 175° F. and under autogenous pressure; and recovering the rubbery polymer so produced.

7. The process according to claim 6 in which the mol ratio of component (b) to component (c) is in the range of 0.5:1 to 2:1.

8. The process according to claim 6 wherein said diluent consists essentially of toluene.

9. The process according to claim 6 wherein said diluent consists essentially of benzene.

10. A process for producing a rubbery polymer of 1,3-butadiene having at least 85 percent cis 1,4-addition which comprises contacting 1,3-butadiene with a catalyst which forms on mixing components comprising (a) a compound corresponding to the formula $R_3Al$, wherein R is selected from the group consisting of alkyl, cycloalkyl, aryl, and combinations of these radicals, (b) a compound corresponding to the formula $Ti(OR)_4$, wherein R is as defined above, and (c) titanium tetraiodide, the mol ratio of said component (a) to said component (c) being in the range of 2:1 to 100:1, the mol ratio of component (a) to component (b) being in the range of 2:1 to 100:1, and the mol ratio of component (b) to component (c) being in the range of 0.5:1 to 3:1.

(References on following page)

References Cited by the Examiner

UNITED STATES PATENTS

| | | | |
|---|---|---|---|
| 2,886,561 | 5/1959 | Reynolds et al. | 260—93.7 |
| 2,959,576 | 11/1960 | Payne | 260—94.9 |
| 2,962,490 | 11/1960 | Edmonds et al. | 260—94.9 |
| 3,036,056 | 5/1962 | Rion | 260—94.3 |
| 3,061,602 | 10/1962 | Duck et al. | 260—94.9 |
| 3,065,220 | 11/1962 | McManimie et al. | 260—94.9 |
| 3,095,406 | 6/1963 | Short et al. | 260—94.3 |

FOREIGN PATENTS

| | | |
|---|---|---|
| 776,326 | 6/1957 | Great Britain. |
| 920,244 | 3/1963 | Great Britain. |
| 551,851 | 4/1957 | Belgium. |
| 591,994 | 12/1960 | Belgium. |
| 665,207 | 6/1963 | Canada. |

JOSEPH L. SCHOFER, *Primary Examiner.*

LEWIS GOTTS, JAMES A. SEIDLECK, *Examiners.*